(12) United States Patent
Dunbar et al.

(10) Patent No.: US 6,439,297 B1
(45) Date of Patent: *Aug. 27, 2002

(54) DEPLOYABLE RADIATORS FOR SPACECRAFT

(75) Inventors: Neil William Dunbar, Stevenage (AU); Philip David McGoldrick, Hertfordshire (GB)

(73) Assignee: Matra Marconi Space UK Limited, Middlesex (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/896,332

(22) Filed: Jul. 17, 1997

(30) Foreign Application Priority Data

Jul. 31, 1996 (GB) ............................................. 9616016

(51) Int. Cl.[7] .................................................. F28F 7/00
(52) U.S. Cl. ..................... 165/46; 165/41; 244/158 R; 244/159
(58) Field of Search ............... 165/46, 104.21, 165/41, 104.26; 244/158 R, 159

(56) References Cited

U.S. PATENT DOCUMENTS

| 3,158,198 | A | | 11/1964 | Hunter, Jr. |
| 3,211,215 | A | | 10/1965 | Walker |
| 3,490,718 | A | | 1/1970 | Vary |
| 3,496,995 | A | * | 2/1970 | Rosen et al. ................... 165/46 |
| 4,212,347 | A | | 7/1980 | Eastman |
| 4,727,932 | A | * | 3/1988 | Mahefkey ................. 165/46 X |
| 4,756,493 | A | | 7/1988 | Camaret |
| 4,813,476 | A | * | 3/1989 | Mahefkey ................. 165/46 X |
| 4,815,525 | A | * | 3/1989 | Readman ...................... 165/41 |
| 4,832,113 | A | * | 5/1989 | Mims et al. .................. 165/41 |
| 4,842,045 | A | | 6/1989 | Reinmuller |
| 4,986,346 | A | * | 1/1991 | Blackmon et al. ........ 165/41 X |
| 5,027,892 | A | * | 7/1991 | Bannon et al. ............... 165/41 |
| 5,117,901 | A | | 6/1992 | Cullimore |
| 5,303,768 | A | * | 4/1994 | Alario et al. .......... 165/104.26 |
| 5,372,183 | A | * | 12/1994 | Strickberger ................. 165/41 |
| 5,472,043 | A | * | 12/1995 | Larson et al. .......... 165/104.21 |
| 5,494,241 | A | * | 2/1996 | Paulain ........................ 165/41 |
| 5,732,765 | A | * | 3/1998 | Drolen et al. ................. 165/41 |
| 5,743,325 | A | * | 4/1998 | Esposto ....................... 165/46 |

OTHER PUBLICATIONS

Mahefkey et al., Heat Pipe Applications for Future Air Force Spacecraft, AIAA, pp. 1–7, Jul. 14, 1980.*

* cited by examiner

Primary Examiner—Christopher Atkinson
(74) Attorney, Agent, or Firm—Donald C. Casey

(57) ABSTRACT

A limiting feature in spacecraft such as communication satellites is becoming the amount of surface such as 5, 6 available for dissipating waste heat from the electrical equipment in the satellite. The invention provides a deployable radiator 11 which carries a number of capillary pumped loops consisting of an evaporator, an outward limb and a return limb. The panel 11 is rolled up to coil the elements prior to launch, and unrolled when in orbit. The outward and return lengths of tube act as condenser for the capillary pumped loop, transport the heat over the radiating panel 11 and also provide the spring force for the panel to unroll.

11 Claims, 3 Drawing Sheets

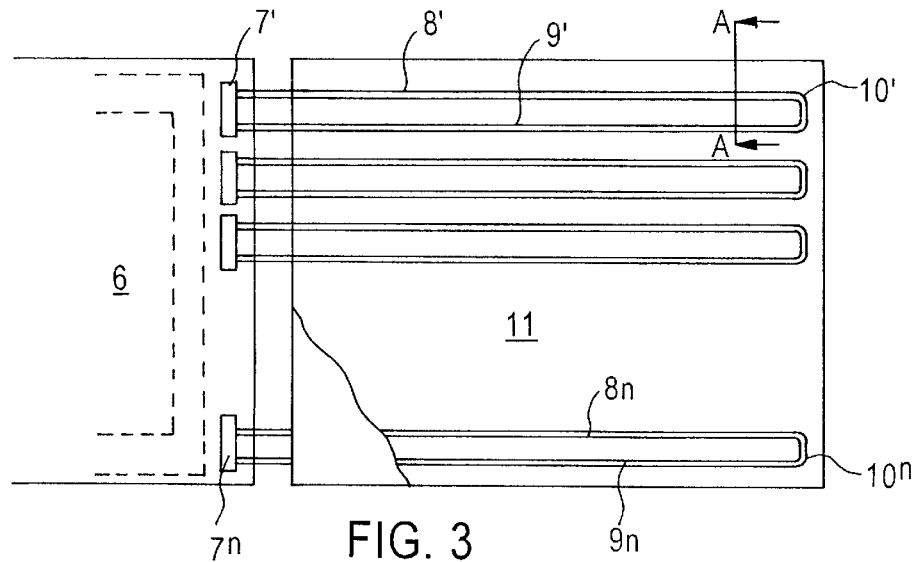
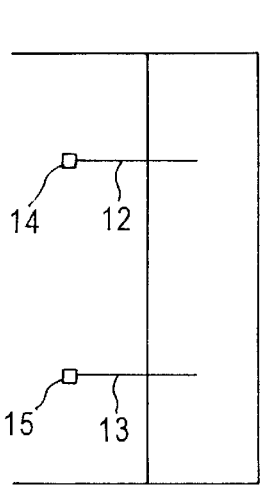
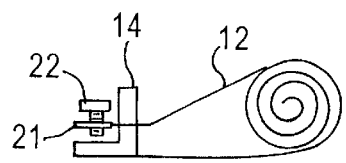
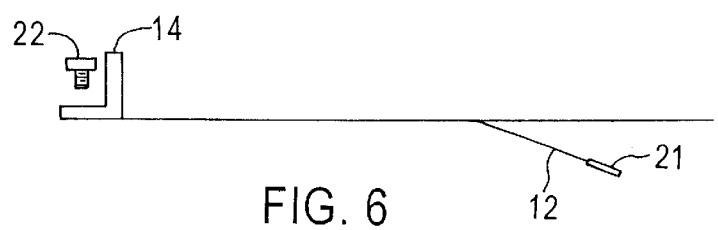
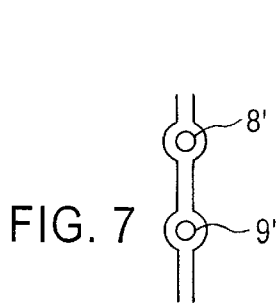
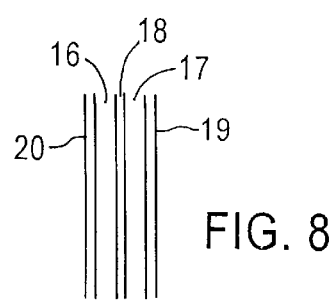

DEPLOYABLE RADIATORS FOR SPACECRAFT

This invention relates to deployable radiators for spacecraft, especially satellites.

A typical communications satellite in earth orbit is shown in FIG. 1. Power is generated by solar panels 1, 2, and r.f. power is transmitted from the dishes 3 or 4. Typically for 1 kW r.f. power generated, something like 4 kW is generated as heat by electrical equipment. This heat must be rejected from the satellite and, to do this, it is conducted by heat pipes or heat transport loops such as capillary pumped loops to radiating surfaces of the satellite. The surfaces 5, 6 of the satellite which face North and South form the radiating surfaces, since these surfaces receive least heat from the sun. It will be remembered that in outer space, heat cannot be rejected by conduction or convection.

The increasing demands placed on communications satellites require more power to be generated with the consequent need to reject more heat. The area of the surfaces 5, 6 cannot be increased without severe packaging problems at launch, and a solution which has been turned to is the use of additional radiating surfaces which are stowed when the satellite is being launched and deployed when it is released (U.S. Pat. No. 5,117,901). The hinge between the additional radiating surface and the satellite is formed by short helical sections of a closed length of a pipe containing a working fluid which also contains a capillary evaporator, and forms a capillary pumped loop. However, the pipe makes several traverses across the panel, where it acts as a condenser, and a relatively heavy evaporator therefore has to be provided to provide the necessary pumping pressure, while the single closed path of the pipe makes it vulnerable to micro-meteorite strikes.

Another proposal for a deployable radiator is the use of a relatively long and wide flat tube forming a heat pipe, which is rolled up for launch and unrolled under the force of vapour pressure of a working fluid in the tube when the satellite is in orbit. The unrolled tube forms a radiator panel attached to a radiating surface of the satellite. However, in a heat pipe, unlike in a capillary pumped loop, the same surfaces are used for evaporation as are used for condensation, and this brings certain disadvantages.

The invention provides a deployable radiator for a spacecraft, which comprises a plurality of capillary evaporators, each of which is connected in a respective closed loop of pipe containing a working fluid, and the loops extending across a linking structure over at least part of their length in such a way that the linking structure together with the loops can be rolled up for launch, and unrolled for deployment.

The arrangement permits convenient stowage of the radiator, while being less prone to a micro-meteorite strike than if a single capillary pump loop was employed.

Advantageously the linking structure unrolls in use under the influence of the spring force of the rolled-up loops and, while this spring force may form the entire force for unrolling the linking structure, an extension mechanism may be provided for assisting with the unrolling. The linking structure may be formed from a layer of conducting material, which may be mounted on a layer of plastics material. Such a layer of conducting material would serve to spread the heat out. The linking structure may be a continuous panel, or could be mesh-like, or even slatted.

The capillary evaporators themselves may be secured to a face of the spacecraft.

A deployable radiator for a spacecraft, constructed in accordance with the invention, will now be described, by way of example, with reference to the accompanying drawings, in which:

FIG. 3 is a bottom plan view of the deployed radiator panel of FIG. 2 showing a part of the satellite only;

FIG. 4 shows the radiator panel in a stowed condition;

FIG. 5 shows a part of the stowing mechanism (not to scale);

FIG. 6 shows the mechanism of FIG. 5 after release of the panel (not to scale);

FIG. 7 is a section taken through the lines A—A of FIG. 3;

FIG. 8 is an enlarged view of a part of the sandwich construction shown in FIG. 7.

Like reference numerals have been given to like parts throughout all the figures.

Figures 1, 2:
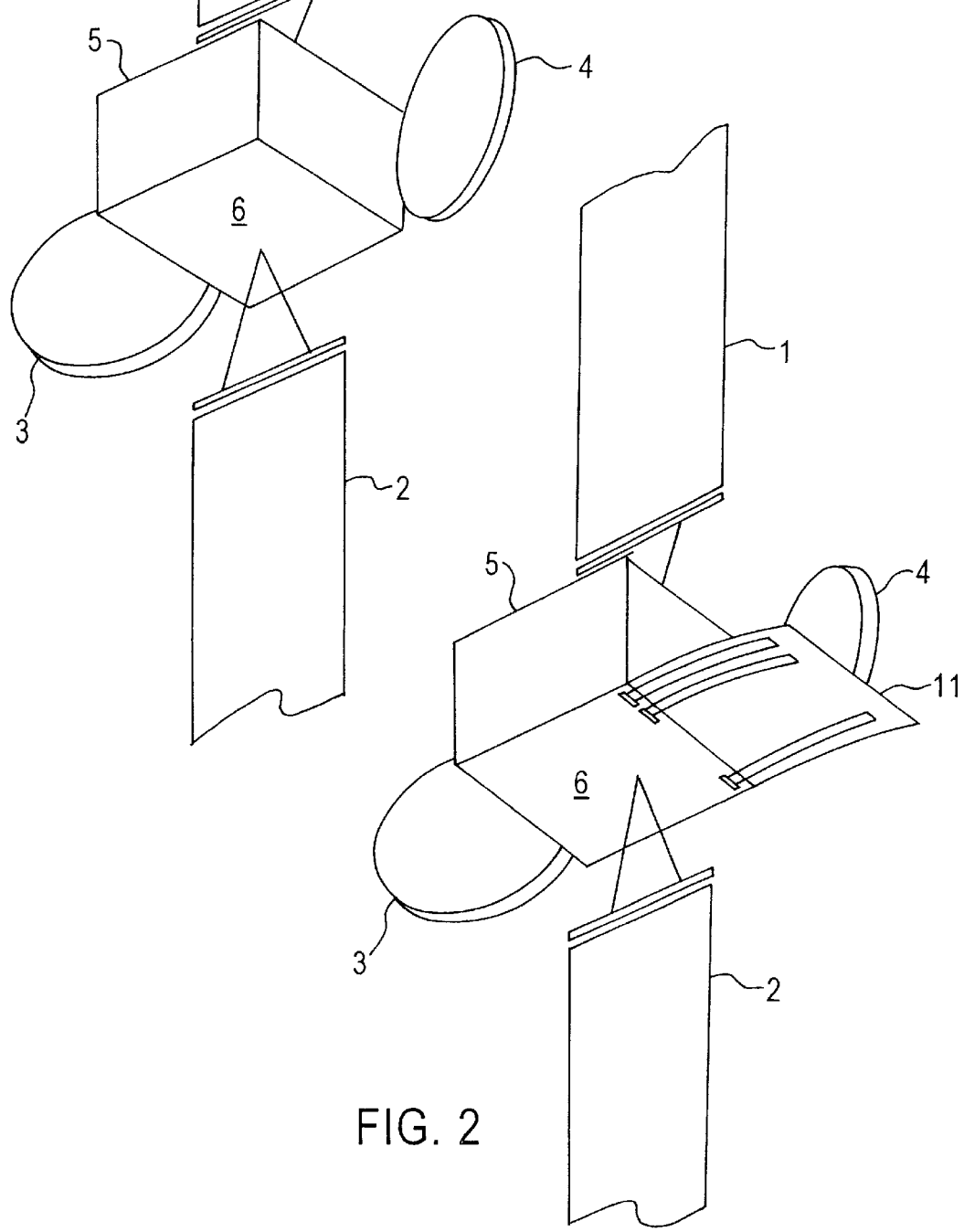
FIG. 1 shows a typical satellite having radiating surfaces but no deployable radiator.
FIG. 2 shows the satellite of FIG. 1 when fitted with the deployable radiator of the invention.

FIGS. 1 and 2 show the satellite from underneath. The satellite is in geostationary orbit in the illustrated example (although the invention is applicable to other orbits as well), so the axis of the long solar panels 1, 2 extends in a North-South direction, which means that the surface 5 faces in a Northerly direction and the surface 6 faces in a Southerly direction. These surfaces receive only oblique heat from the sun at various parts of their orbit, and therefore are used for radiating the waste heat generated by the electrical equipment of the satellite. Each surface 5, 6 may be provided with a grid of heat pipes to distribute the heat fed to the surfaces from inside the satellite over the full surface area of the radiating surfaces.

In accordance with the invention, referring to FIGS. 2 and 3, the satellite also has a deployable radiator in the form of a plurality of capillary pumped loops which extend across a linking structure 11, and which springs out into a more or less flat shape when released.

Referring to FIG. 3, a row of small capillary evaporators $7^1$ to $7^n$ is mounted on the radiating surface 6 adjacent to the right hand edge as seen in FIGS. 2 and 3. Each capillary evaporator $7^1$ etc is connected to pipes $8^1$, $9^1$ of narrow diameter which are joined by short sections of similar pipe $10^1$. Each evaporator $7^n$ is therefore contained in a closed loop $8^n$, $10^n$, $9^n$ which contains a working fluid, and together these form a capillary pumped loop for example as described in U.S. Pat. No. 5,117,901 and the Applicants' own patent application Ser. No. 96/09277.0. Working fluid is vaporized in the evaporator $7^n$ and the hot vapour travels along the pipe $8^n$ where it gives up heat and gradually condenses to liquid form. The liquid is returned to the evaporator $7^n$ via the limb $9^n$, where the heat received by the evaporator $7^n$ evaporates the working fluid in the capillary structure of the wick of the evaporator. The closed loop $8^n$, $10^n$, $9^n$ thus serves as a condenser for the capillary pumped loop.

The loops $8^n$, $10^n$, $9^n$ are secured to a linking structure 1, which is a plastics/conducting foil panel. The conducting foil serves to distribute the heat in the loop over the surface of the panel.

The springiness of the pipes themselves when rolled-up provides the motive force to unfurl the radiating surface.

The loops of pipe $8^n$, $9^n$ are sandwiched together between a pair of panels over most of their length, but for the sake of explanation, most of the top panel has been cut away in FIG. 3. A small section A—A of the complete sandwich is shown in FIG. 7. FIG. 8 shows the even smaller section between the pipes $8^1$, $9^1$. Thus, the panels each comprise a layer of plastics material of high radiation (cosmic particle) resistance 19, 20, a suitable material being a polyimide for example KAPTON (Trade Name), carrying a layer of conductive material 16, 17 such as aluminium, secured together by a layer of sheet adhesive 18. Such a structure provides high infra-red emissivity and low solar absorptivity. Typical thicknesses are 25–50 μm for the plastics material 19, 20 and 100 μm for the conductive layers 16, 17. Alternatively, the layer of conductive material could have a layer of plastics material on one side and a layer of paint on the other, or just a layer of paint on each side.

Thus, the panel 11 together with the loops $8^n$, $10^n$, $9^n$ are rolled up about the right hand end of the panel as seen in FIG. 3 and stowed by means of straps 12, 13 held to the radiating surface respectively by release devices such as memory metal clamps 14, 15 (FIG. 4), or alternatively pyrotechnic devices could be used.

Referring to FIGS. 5 and 6, the cables 12, 13 have annuli 21 at the ends which are held in pins 22 of the clamps 14 (FIGS. 5 and 6 only show the memory metal clamp 14). When it is desired to deploy the radiating surface in space, an electric current is passed through the pin 22 making the pin retract and release the annulus 21 thereby releasing the strap 12. The same thing happens with the memory metal clamp 15. The panel then unfurls under the spring forces of the loops $8^n$, $10^n$, $9^n$. As will be seen in FIG. 2, the panel has a slight residual curvature when deployed, which is found to be advantageous in practice.

The row of capillary evaporators $7^1$ to $7^n$ are mounted in thermal contact with a heat pipe, a region of which is shown by the broken line in FIG. 3, and which is embedded in the radiating surface 6. For example, the heat pipe may have a flange to which the capillary evaporators may be bolted. If desired, similar radiating panels could be provided to extend from the other three edges of the radiating surface 6 or from one or more edges of the radiating surface 5.

At least ten loops may be provided on the panel 11 and, in one example, fifty loops were found to be very effective. Each loop was capable of dissipating 20–50 W, and the pipe $8^n$, $10^n$, $9^n$ had an internal diameter of 0.9 mm and a length of 1 m. The working fluid for the capillary pumped loops as well as for the heat pipes in the radiating surfaces was ammonia, although water could have been used. The pipe may be made of stainless steel or Inconel, and the evaporator may be sized at 25 mm×50 mm.

The example whose dimensions are given above may be rolled into a diameter of 100 mm or less.

Alternative release mechanisms in place of those shown in FIGS. 5 and 6 may be used. For example, retractable pins may be employed, or a thermal knife may be employed. With the latter, heat developed in a component melts the straps 12, 13 to release the panel.

The system is inherently redundant and proof against micro-meteorite strike, provides very good conductance since the contact area to the collector heat pipe in thermal contact with the row of evaporators is large, is very light, and need not interfere with either solar array or reflectors. This latter means that in the event of failure to deploy, only part of the thermal capacity is reduced.

Estimated mass is 1.6 kg per square meter, capable of rejecting about 400 W.

The deployed frequency would be low, since the deployed panel would only have pipes as stiffeners. However, the mass is also low (deployed section only 1 kg per square meter), helping to ameliorate this problem. The pipes can be joined together with perpendicular cross members for some improvement, and the plastics sheet could be replaced by many strips of carbon fibre (like a slatted blind), which could increase stiffness at the expense of mass. The panels only need to be flexible in the direction to allow them to be folded up.

The short length of pipe 10 has been shown joining the long sections 8, 9, but if desired the loop 8, 10, 9 could be made from one length of pipe.

The deployable radiator may be mounted away from the main radiators of the satellite, and could for example form a dedicated radiator attached to a collector heat pipe of a phased array antenna.

There is no need for the evaporator $7^1$ to $7^n$ to form a row adjacent to an edge of the radiating surface 6. If desired, the evaporators $7^1$ to $7^n$ could be mounted in the vicinity of components, so that to the left of the right hand edge of the radiating surface 6 as seen in FIG. 3, the loops need not be parallel and could spread out in any direction. The loops are parallel to the right of the right hand edge of the radiating surface 6, and would have to be clamped on or near to that edge.

Figure 9:
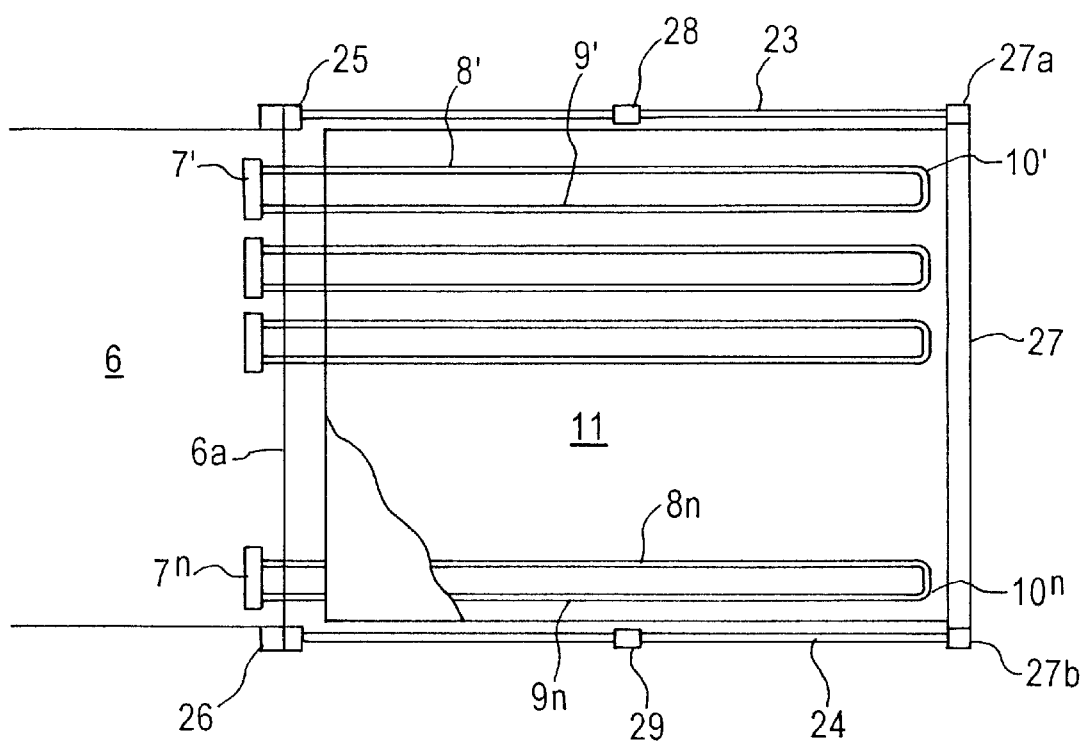
FIG. 9 is a bottom plan view of a modified deployed radiator panel.

If desired, an extension mechanism may be provided to assist unfurling of the panel, particularly in larger assemblies. Suitable extension mechanisms include hinged arms or telescopic masts. Referring for example to FIG. 9, a modified radiator is shown, in which an extension mechanism is provided. In other respects, the panel is the same as that shown in FIG. 3.

The extension mechanism comprises arms 23, 24 extending from attachment points 25, 26 on the spacecraft to a roller 27 secured to the outermost edge of the panel. The arms 23, 24 are each hinged at 28, 29.

In the stowed condition, the panel 11 is rolled up around the roller 27, and the arms 23, 24, folded back along their length at the hinges 28, 29, lie adjacent to and parallel to the right hand edge of the surface 6 (as seen in FIG. 9). Thus, the part of arm 24 to the left of hinge 29 (as seen in FIG. 9) extends from attachment point 26 along edge 6a in the stowed state. At hinge 29, the rest of the arm is folded back in the opposite direction so that the end of roller 27 is held adjacent to attachment point 26. The same applies to arm 23, except that this extends from attachment point 25 along edge 6a, and the other end of the roller is held adjacent to that attachment point.

Motors (not shown) in hinges 28, 29 rotate to open up the folded arms to deploy the radiator, the arms remaining in the plane of the drawing for the deployment operation. The ends 27a, 27b of the roller 27 rotate relative to the main body of the roller (for example, the ends may connect to a rigid rod through the centre of the roller acting as an axle), so that as the arms unfold from an included angle for each arm of 0° to 180° as shown in FIG. 9, the roller gradually unrolls the panel, until the extreme, deployed, state shown in FIG. 9 is reached. The springiness of the panel assists in the unrolling process.

The presence of the roller 27 and arms 23, 24 adds some stiffness to the deployed panel. In addition, the roller acts to apply deployment force uniformly and to shape the rolled up radiator. This arrangement is particularly suited to larger panels, for example, up 4 meters in length.

The strap to hold the panel in the furled condition may now no longer be necessary.

In an alternative version, the arms could fold in the plane defined by their length and the normal to the plane of the drawings, in which case they would lie adjacent and parallel to a vertical edge of the spacecraft as seen in FIG. 2 in their stowed position.

In some cases, the roller may be dispersed with, the arms being secured to attachment points at the outermost end of the panel 11.

Reversible motors may be provided to enable the deployed panel to be rolled up, or partly roller up, when in space.

Other actuators may be used in place of the motors in the hinges 28, 29, or the actuators or motors may be positioned other than at the hinges e.g. in the roller 27.

What is claimed is:

1. A deployable radiator adapted to be mounted on a radiating surface of a spacecraft, which radiator comprises a linking panel structure.

at least ten springy closed loops of pipe each containing a working fluid and each at least partially extending across the linking structure panel and being attached thereto, and a plurality of capillary evaporators connected, one in each closed loop of pipe, each of which evaporators is adapted to be secured to the radiating surface of a spacecraft, said closed pipe loops and linking panel being sufficiently flexible to be rolled-up, whereby the linking panel structure and the springy closed loops of pipe secured thereto can be rolled up and secured for launch, and deployed by unrolling under influence of the spring force of the rolled up loops.

2. A deployable radiator as claimed in claim 1, in which the spring force of the rolled up loops provides the entire force for unrolling the linking panel structure.

3. A deployable radiator as claimed in claim 1, including a hinged arm extension mechanism for assisting the unrolling of the linking panel structure.

4. A deployable radiator as claimed in claim 2, wherein the extension mechanism is reversible to permit the linking panel structure and attached springy closed loops of pipe to be at least partially re-rolled up in space.

5. A deployable radiator as claimed in claim 1, further comprising a telescopic mast extension mechanism for assisting the unrolling of the linking panel structure.

6. A deployable radiator as claimed in claim 1, wherein the linking panel structure includes at least one layer of conducting material and at least one layer of plastics material.

7. A deployable radiator as claimed in claim 6, wherein the layer of conducting material is coated on the layer of plastics material.

8. A deployable radiator as claimed in claim 7, wherein the linking panel structure comprises a pair of layers of plastics material coated with respective layers of conducting material, an in which the springy closed loops of pipe are sandwiched between the facing conducting material layers.

9. A deployable radiator as claimed in claim 1, further comprising a heat pipe provided on said spacecraft radiating surface, said capillary evaporators being thermally connectable with said heat pipe.

10. A deployable radiator as claimed in claim 1, wherein the capillary evaporators are arrangeable in a row on said spacecraft radiating surface.

11. A deployable radiator as claimed in claim 1 wherein the springy closed loops of pipe extend parallel to each other across the linking panel structure.

* * * * *